United States Patent [19]
Lash et al.

[11] Patent Number: 6,086,220
[45] Date of Patent: Jul. 11, 2000

[54] MARINE SAFETY LIGHT

[75] Inventors: Anthony B. Lash; Peter D. Stevens, both of Toronto, Canada

[73] Assignee: Lash International Inc., Toronto, Canada

[21] Appl. No.: 09/163,550

[22] Filed: Sep. 30, 1998

[51] Int. Cl.[7] .............................. F21V 5/04; F21V 23/00; G08B 5/36

[52] U.S. Cl. .......................... 362/244; 362/158; 362/186; 362/276; 362/252; 362/800; 362/477; 340/815.45; 340/985

[58] Field of Search .................................. 362/477, 545, 362/158, 184, 185, 186, 244–246, 235, 236, 276, 252, 800, 807, 802; 340/984, 985, 815.45

[56] References Cited

U.S. PATENT DOCUMENTS

| | | | |
|---|---|---|---|
| 3,818,428 | 6/1974 | Phipps et al. | 340/29 |
| 4,384,268 | 5/1983 | Matthewman | 340/29 |
| 4,389,632 | 6/1983 | Seidler | 340/985 |
| 4,626,852 | 12/1986 | Dodge | 340/985 |
| 4,856,452 | 8/1989 | Pingel et al. | 114/364 |
| 5,006,971 | 4/1991 | Jenkins | 362/252 |
| 5,122,781 | 6/1992 | Saubolle | 340/473 |
| 5,140,220 | 8/1992 | Hasegawa | 313/512 |
| 5,197,798 | 3/1993 | Tickner | 362/235 |
| 5,313,188 | 5/1994 | Choi et al. | 340/815.45 |
| 5,374,876 | 12/1994 | Horibata et al. | 315/313 |
| 5,404,282 | 4/1995 | Klinke et al. | 362/249 |
| 5,416,670 | 5/1995 | Authier | 362/34 |
| 5,495,147 | 2/1996 | Lanzisera | 315/185 |
| 5,594,433 | 1/1997 | Terlep | 340/908.1 |
| 5,711,591 | 1/1998 | Jordan | 362/61 |
| 5,782,552 | 7/1998 | Green et al. | 362/183 |
| 5,782,553 | 7/1998 | McDermott | 362/245 |
| 5,899,557 | 5/1999 | McDermott | 362/244 |

*Primary Examiner*—Alan Cariaso
*Attorney, Agent, or Firm*—Bereskin & Parr

[57] ABSTRACT

A marine safety light for maximizing a boat's visibility to other boaters during darkness and inclement weather conditions consisting of a LED array which consists of a plurality of LEDs arranged in a star configuration. The LED array preferably consists of six white LEDs evenly spaced in the horizontal plane and positioned within a fresnel lens such that an even omni-directional distribution of light is emitted. LED array is powered using a power circuit which includes two conventional DC to DC converters which regulate the output voltage, allowing the marine light to operate at a constant brightness for a substantial period of time on a conventional 1.5 volt power source. Further, the power circuit automatically shuts the marine safety light off when sufficient ambient light is available and provides a continuous flashing signal when the power source is low.

10 Claims, 5 Drawing Sheets

MARINE SAFETY LIGHT

FIELD OF THE INVENTION

The present invention relates generally to lighting devices and in particular to a marine safety light for maximizing a boat's visibility to other boaters during darkness and inclement weather conditions.

BACKGROUND OF THE INVENTION

The increased popularity for boating has resulted in increased waterway traffic and created a substantial need for reliable and effective marine safety lighting equipment for boats. National coast guard and international marine regulations require power driven and sailing vessels to display an all-round white anchor light with a visibility of two nautical miles, except in designated anchorages. While reliable operation of a safety light is critical to preventing accidental collisions during darkness and inclement weather conditions, many boats still do not consistently comply with these regulations due to a lack of market available reliable and energy efficient marine safety lights.

Most marine safety lighting systems such as that disclosed in U.S. Pat. No. 5,711,591 to Jordan utilize one or more incandescent light bulbs as the light source. Incandescent bulbs are used for their omni-directional light characteristics as they provide illumination 360 degrees around the bulb. However, the use of incandescent bulbs results in an unreliable and ineffective device which requires a high degree of maintenance, due to several physical shortcomings of incandescent lamps and their general incompatibility with the marine environment.

Incandescent bulbs consist of a resistive tungsten filament suspended by support wires with a vacuum inside a glass envelope. As a result, they are highly susceptible to damage due to variations in temperature, mechanical shock or vibration and voltage spikes or transients. Since safety marine lights are generally positioned on top of a masthead for optimal visibility, severe environmental and/or mechanical damage may occur when the boat traverses rough water. Under such conditions additional forces and stresses are exerted on the entire masthead light assembly. Further, since the typical life of incandescent lamps usually averages around a thousand hours, it must be replaced several times during the course of the year simply due to normal life expiry. It is common for users to forget or delay replacing bulbs when they have expired, especially when the marine safety light is inconveniently positioned on the boat (i.e. on a masthead).

Further, since incandescent bulbs have high power requirements, their use in a marine safety light can cause other significant safety problems. Most marine safety lights such as those disclosed in U.S. Pat. No. 4,856,452 to Pingel et al. are adapted to draw power through the boat's electrical system from the boat's battery. However, since incandescent bulbs will run down a boat's battery at a rapid rate due to the high draw of the bulb, crucial boat systems can be affected resulting in significant inconvenience and even serious danger. This eventuality causes boaters to neglect to use their safety lights due to the effect on their boat's power system. Further, the use of a stand alone battery powered safety light system requires frequent replacement of the battery as incandescent bulbs run down battery power at a high rate.

Thus, there is a need for a marine light which can safely and reliably provide omni-directional light, which can operate for a long period of time on a convenient energy supply, and which requires minimal maintenance.

BRIEF SUMMARY OF THE INVENTION

It is therefore an object of the present invention to provide a marine safety light for a boat for alerting other vessels of the presence of the boat, said marine light comprising:

(a) an array of light emitting diodes having a uniform star configuration around a centre point such that the diodes are equally spaced around the centre point and such that the diodes face outwardly from the centre point;

(b) a light transmitting member surrounding the array of light emitting diodes; and (c) a power supply for supplying electrical power to the array of light emitting diodes.

Further objects and advantages of the invention will appear from the following description, taken together with the accompanying drawings.

DETAILED DESCRIPTION OF PREFERRED EMBODIMENTS

Figure 1:
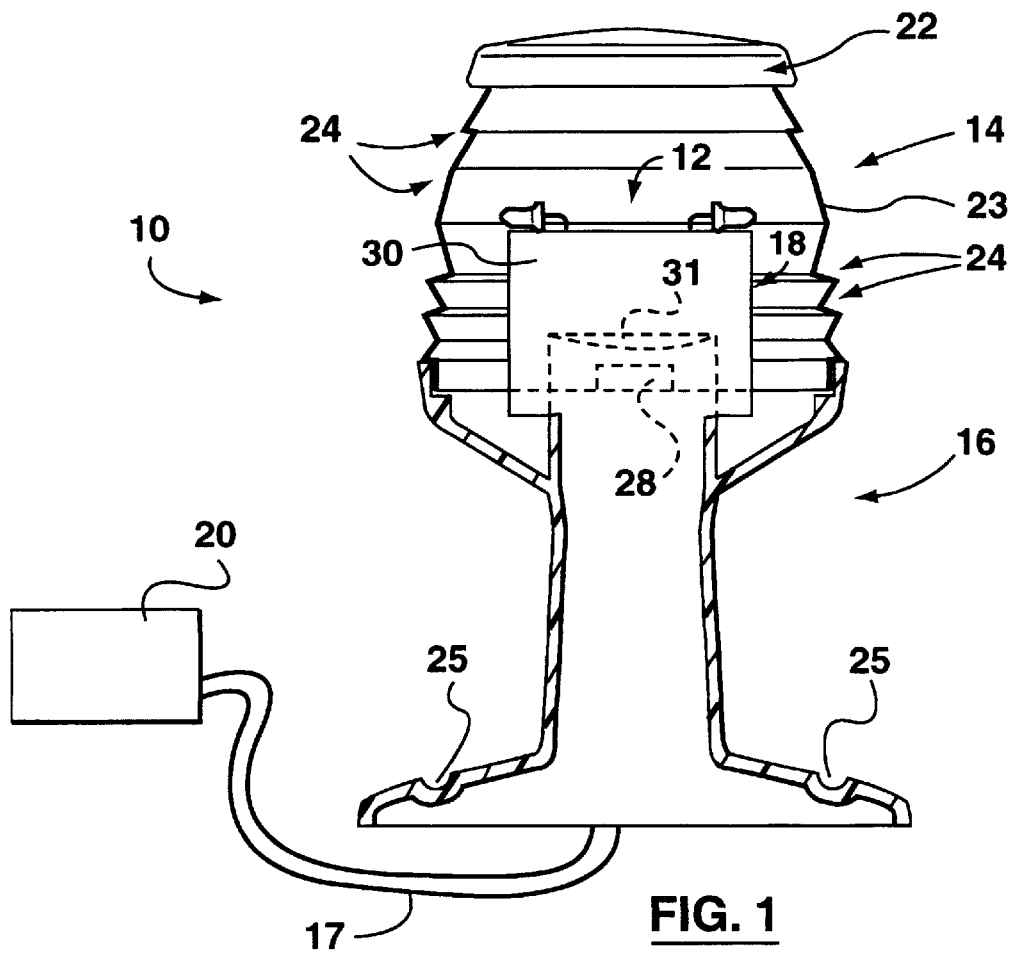
FIG. 1 is a cross-sectional side view of a preferred embodiment of a marine light according to the invention.

Reference is first made to FIG. 1 which shows a marine safety light 10 made in accordance with a preferred embodiment of the present invention. Marine light 10 comprises a light emitting diode (LED) array 12, lens 14, lamp base 16, power circuit 18 and power source 20.

LEDs are semiconductor devices which emit a visible light when current biased in the forward direction. Unlike standard bulb type lamps, LEDs are immune to failure conditions such as filament breakage due to sudden shocks or bumps and are well suited for use in the turbulent and extreme weather conditions of a typical marine environment. In addition, LEDs are highly energy efficient as they only require a small amount of electricity to generate a relatively strong light. For example, a typical incandescent lamp operates on 5 volts and uses a current of 115 milliamps while a LED can operate on 3 volts and draw current on the order of 5 milliamps. Accordingly, LEDs are a particularly desirable lighting source in applications where energy efficiency is important and only limited power sources are available, such as on a motor or sailing boat.

The LEDs of LED array 12 are preferably 5 milliamp white LEDs such as the NSPW series white LED manufactured by Nichia Chemical Industries, Ltd. of Japan. Since the rated lifetime of these LEDs is approximately 15 years, LED array 12 provides marine light 10 with an extremely energy efficient, long lasting and durable light source. The inventors have determined that such an LED array 12 produces visible light over one nautical mile away from the vessel.

Lens 14 includes an opaque top cap 22 and a conventionally known fresnel lens 23 formed out of clear plastic. Using well known fresnel techniques, the stepped setbacks 24 of fresnel lens 23 provide the optical properties of a much thicker lens causing low vertical dispersion of the light produced by LED array 12. Fresnel lens 23 thus produces a focal point of light along a horizontal plane which cuts through the centre of lens 14. Lens 14 also has three rectangular protrusions (not shown) protruding down from the bottom of the rim edge of lens 14. Rectangular protrusions are used to removably lock lens 14 into lamp base 16.

Lamp base 16 is moulded and fabricated out of plastic and contains circular grooves 25 to securely mount marine light 10 onto a horizontal surface of a boat. Lamp base 16 also has three restraining locking rectangular grooves 28 positioned along the top inside rim of lamp base 16 which are designed to removably interlock with the three rectangular protrusions of lens 14. The interior of lamp base 16 is hollow (not shown) to permit a pair of lamp wires 17 to run through lamp base 16 between power circuit 18 and power source 20.

Lens 14 can be locked into lamp base 16 by positioning and lowering the three rectangular protrusions over and into the three rectangular grooves 28 and turning lens 14 clockwise as is conventionally known. This locks in lens 14 into an watertight fit with lamp base 16. Lens 14 can also be removed as is conventionally known by turning lens 14 counterclockwise and lifting lens 14 vertically out of lamp base 16.

Power circuit 18 is coupled to power source 20 and provides regulated DC power to LED array 12. Power circuit 18 powers LED array 12 such that each LED receives approximately 4 milliamps of current. The inventor has determined that this level of current causes LEDs of LED array 12 to produce sufficient brightness that the device can be seen at a distance of one nautical mile under clear conditions. Power circuit 18 also turns marine light 10 off when sufficient ambient light is available or when navigation lights are on, and provides a visual indication of a low battery. Power circuit 18 is implemented on a printed circuit board 30 which is securely positioned within a restraining clamp 31 of lamp base 16.

Power source 20 comprises a conventional battery adapter and battery with corrosion resistant connections to endure marine conditions. The battery is electronically protected against accidental short circuits. Power source 20 is typically positioned below the deck of a boat to further protect power source 20 from elemental corrosion. Since power source 20 is separate from the boat's battery system, the operation of marine light 10 does not affect other crucial systems. Power source 20 is a battery pack which comprises a plurality of 1.5 volt batteries connected in parallel.

Figure 2A:
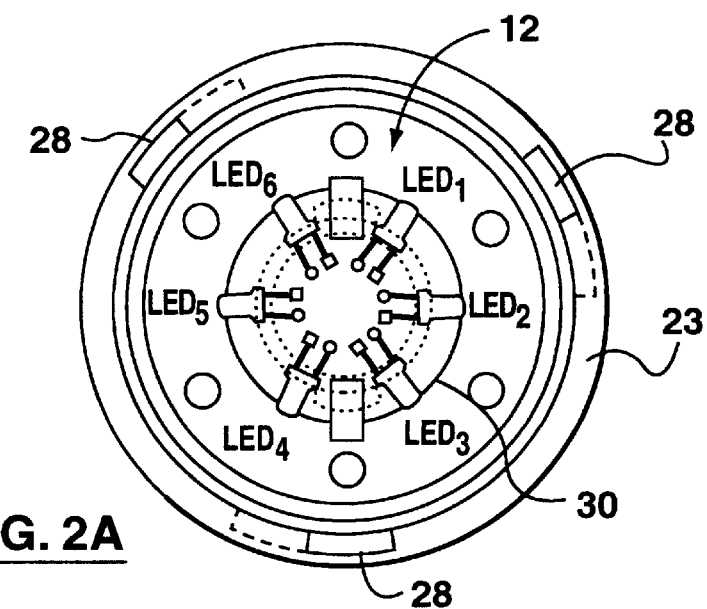
FIG. 2A is a top view of the LED array positioned within the lamp base of FIG. 1.

Reference is next made to FIG. 2A which shows a top view of LED array 12 positioned within lamp base 16 with lens 14 removed. LED array 12 is shown to comprise six individual LEDs, $LED_1$, $LED_2$, $LED_3$, $LED_4$, $LED_5$ and $LED_6$ arranged in an equally spaced six-point star configuration. Since LED array 12 comprises six LEDs, $LED_1$ will be oriented 60 degrees from $LED_2$, $LED_2$ will be 60 degrees from $LED_3$ and so forth. A top section of fresnel lens 23 is shown surrounding LED array 12. Three lamp base grooves 28 are also shown positioned around LED array 12 in the top inside rim of lamp base 16.

Figure 2B:
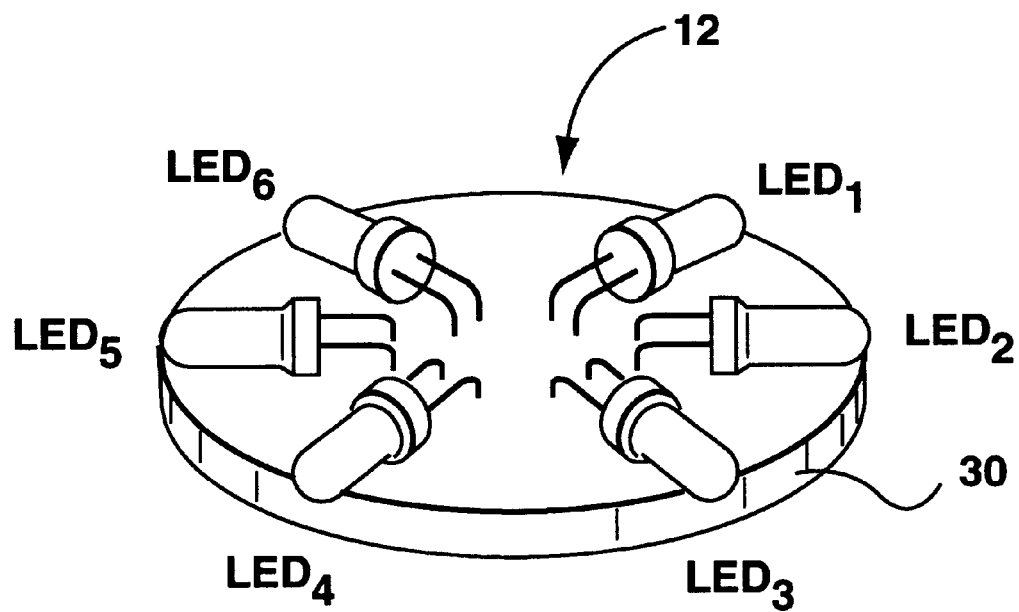
FIG. 2B is a side perspective view of the LED array positioned on a disk-shaped printed circuit board.

FIG. 2B shows a side perspective view of LED array 12 positioned within lamp base 16 with lens 14 removed. As shown, LED array 12 is mounted on top of a disk-shaped top portion of printed circuit board 30.

Figure 3:
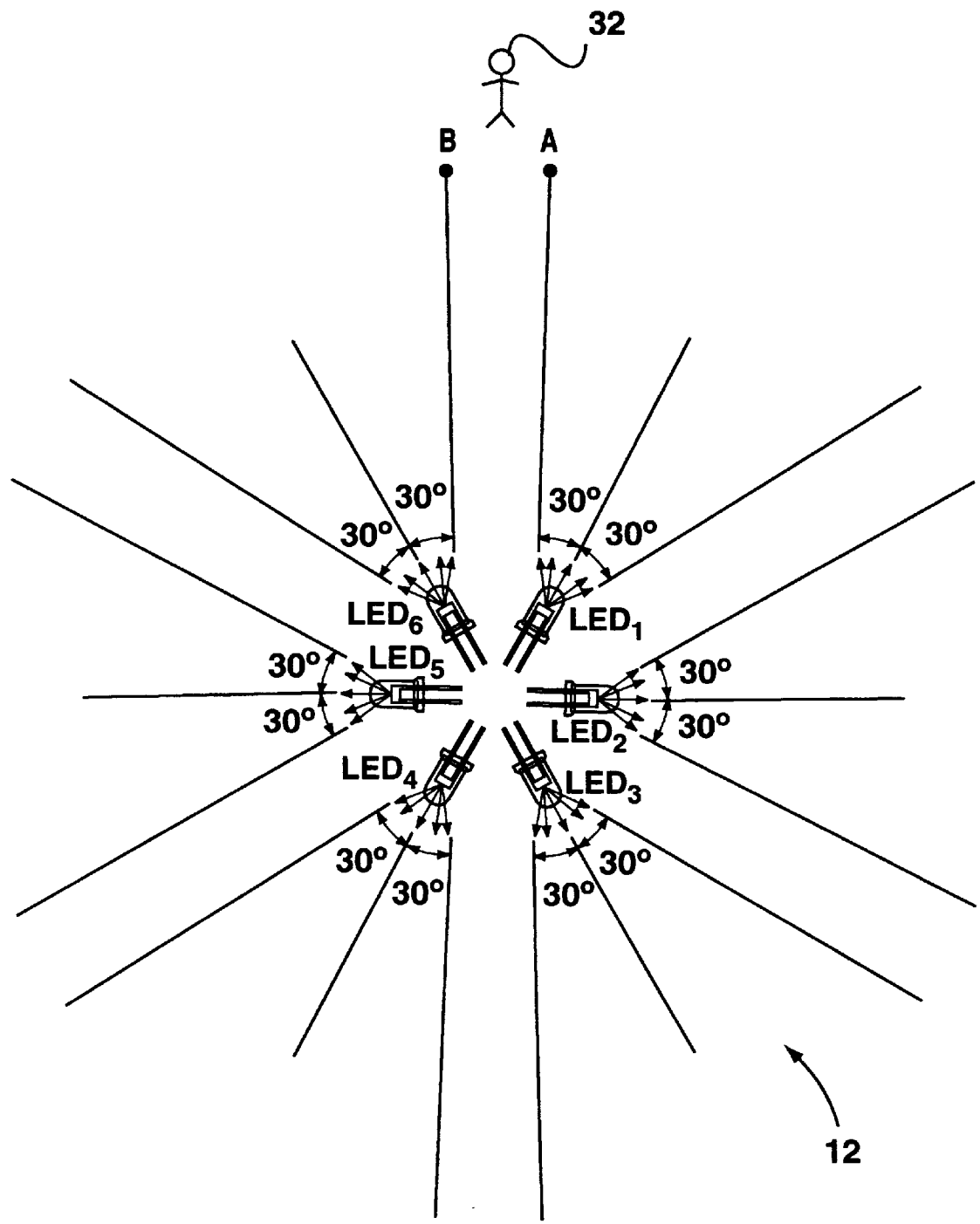
FIG. 3 is a top view of the lighting characteristics of the LED array of FIG. 1.

FIG. 3 shows the light characteristics of LED array 12. Each Nichia brand LED has an output beam width (bounded by its one-half intensity points) of 60 degrees. That is, a 50 per cent falloff in light output occurs at the edge of the 60 degree cone of light produced by each LED. The inventor has determined that by arranging the six LEDs, $LED_1$, $LED_2$, $LED_3$, $LED_4$, $LED_5$ and $LED_6$ in an evenly spaced manner, an even omni-directional distribution of light is produced. As shown, each cone of light is centred around the front face of each LED. It should be noted that since the light emitting centres of the LEDs of LED array 12 are spaced apart to form a ring, the edges of the respective light cones do not exactly coincide. However, at reasonable viewing distances from marine light 10, a viewer 31 will perceive an even light extending 360 degrees around LED array 12.

For any particular horizontal vantage point around marine light 10, the light from at least two LEDs will be seen. This allows for slight faults and non-uniformity in brightness characteristics of individual LEDs. Further, since light brightness is linearly additive, the brightness of the LED array 12 will never fall below 50% of any one of its individual LEDs. For example, a viewer 31 at a distance of 100 feet will see the light emitted from both $LED_1$ and $LED_6$. $LED_1$ at point A emits 50% of its full rated brightness at 100 feet and $LED_6$ at point B will emit 50% of its full rated brightness at 100 feet. Thus, viewer 31 will perceive full rated brightness of either $LED_1$ or $LED_6$ at 100 feet. At further distances such as a half or quarter mile, also typically in marine application, viewer 31 will perceive a strong horizontally focussed light source due to the effect of the star configuration of LED array 12 in combination with fresnel lens 23.

Figure 4:
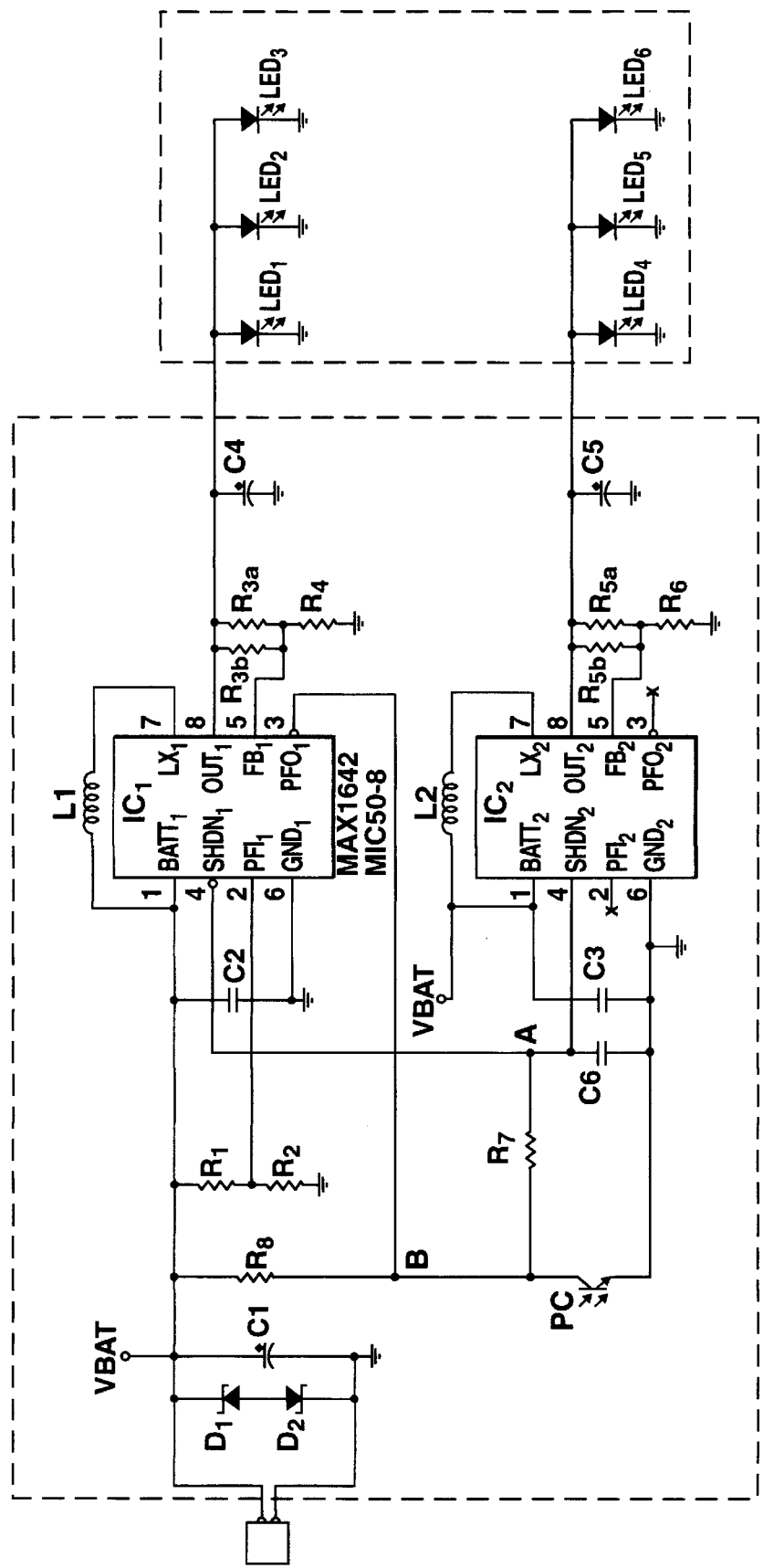
FIG. 4 is a schematic view of the marine light.

FIG. 4 shows an exemplary implementation of marine light 10 using two commercially available DC to DC voltage conversion integrated circuits $IC_1$ and $IC_2$, which may typically be a MAX1642 DC—DC converter ICs supplied by Maxim Integrated Products of Sunnyvale, Calif. The MAX 1642 DC—DC converter is designed to provide power to devices from a single alkaline cell and provides 80% of the power stored in a battery to LED array 12 over the course of battery life. The output remains constant as the power source discharges.

Power source 20 is coupled to power circuit 18, which in turn provides LED array 12 with optimal operating conditions. Power source 20 can consist of a battery pack having 24 1.5 volt D-Cell Alkaline batteries to provide one year of operation. Power circuit 18 converts input voltage received from power source 20 into two 2.8 volt sources to drive LED array 12. Power circuit 18 includes a protection circuit and utilizes integrated circuits $IC_1$ and $IC_2$ to provide full power to LED array 12 while power circuit 18 is in full operation. Power circuit 18 also causes LED array 12 to shut down when sufficient ambient light is available and causes LED array 12 to flash continuously when power source 20 is experiencing a low battery.

LED array 12 comprises two LED strings 12a and 12b. LED string 12a comprises LEDs $LED_1$, $LED_2$ and $LED_3$ connected in parallel and LED string 12b comprises LEDs $LED_4$, $LED_5$ and $LED_6$ connected in parallel. LED string 12a is powered through integrated circuit $IC_1$ and LED string 12b is powered through integrated circuit $IC_2$ as each integrated circuit can only provide enough current for three LEDs.

Power source 20 is connected to a common anode arrangement of 2.4 volt diodes $D_1$ and $D_2$ to provide circuit protection as is conventionally known. Accordingly, power circuit 18 is prevented from being damaged by transients that exceed 2.4 volts or in the event that a user connects power source 20 in reverse. The cathodes of diodes $D_1$ and $D_2$ are connected across a 100 microfarad capacitor $C_1$ which is used to filter out variations in power source 20 voltage and to produce voltage $V_{BAT}$.

Power circuit 18 also includes integrated circuits $IC_1$, and $IC_2$ which are individually configured, in part, according to manufacturer's specifications to operate as a step up DC to DC voltage converter. Integrated circuits $IC_1$ and $IC_2$ have pins $GND_1$ and $GND_2$ connected to ground and pins $BATT_1$ and $BATT_2$ connected to voltage $V_{BAT}$. Pins $BATT_1$ and $BATT_2$ are also coupled to ground through capacitor $C_2$ and $C_3$ to further stabilize the voltage of $BATT_1$ and $BATT_2$ and each have values of 0.1 microfarads. Pins $BATT_1$ and $BATT_2$ of integrated circuits $IC_1$ and $IC_2$ are also connected through inductors $L_1$ and $L_2$ to pins $LX_1$ and $LX_2$. Inductors $L_1$ and $L_2$ produce a voltage stepup, in this case from 1.5 volts to 3 volts, and each has a value of 100 millihenry. Power circuit 18 can operate in three different modes of operation, normal full power mode, daylight turnoff mode and low battery mode.

In full power mode, integrated circuits $IC_1$ and $IC_2$ are configured to provide operational voltage to LED array 12. Specifically, pin $FB_1$ is connected to a resistor voltage divider circuit comprising resistors $R_{3a}$, $R_{3b}$, and $R_4$ between pins $OUT_1$ and $GND_1$ and pin $FB_2$ is connected to a resistor voltage divider circuit comprising resistors $R_5$ and $R_6$ between pins $OUT_2$ and $GND_2$. Since pins $FB_1$ and $FB_2$ regulate to 1.23 volts, the values of resistors $R_{3a}$, $R_{3b}$, and $R_4$ can be selected according to:

$$\frac{R_{3a} R_{3b}}{R_{3a} + R_{3b}} = R_4 \left( \frac{V_{OUT_1}}{V_{REF}} - 1 \right)$$

and similarly the values of resistors $R_{5a}$, $R_{5b}$, and $R_6$ can be chosen according to:

$$\frac{R_{5a} R_{5b}}{R_{5a} + R_{5b}} = R_6 \left( \frac{V_{OUT_2}}{V_{REF}} - 1 \right)$$

where VREF=1.23 volts. It is preferred that pins $OUT_1$ and $OUT_2$ provide 3 volts to LED strings 12a and 12b. Accordingly, resistors $R_{3b}$, $R_4$, $R_{5b}$ and $R_6$ have values of 475 Kohms, 365 Kohms, 475 Kohms and 365 Kohms, respectively. $R_{3a}$ and $R_{5a}$ are chosen during assembly so as to trim or adjust the resistance between pins $OUT_1$ and $FB_1$ and pins $OUT_2$ and $FB_2$ respectively, such that pins $OUT_1$ and $OUT_2$ provide the preferred voltage to LED strings 12a and 12b. Thus, when power circuit 18 is in a normal operation mode, pin $OUT_1$ will provide 3 volts to the anodes of $LED_1$, $LED_2$ and $LED_3$ and pin $OUT_2$ will provide 3 volts to the anodes of $LED_4$, $LED_5$ and $LED_6$. This will result in approximately 4 milliamps being drawn through each LED of LED array 12. Capacitors $C_4$ and $C_5$ limit output peak current and each have a value of 22 microfarads in this implementation.

In daylight turnoff mode, integrated circuits $IC_1$ and $IC_2$ are configured such that while ambient light is detected by a photocell PC, pins $OUT_1$ and $OUT_2$ will not provide power to LED array 12. Photocell PC is connected in series with resistor $R_7$ and capacitor $C_6$. When pins $SHDN_1$ and $SHDN_2$ go low, they cause integrated circuits $IC_1$ and $IC_2$ to shutdown. Voltage $V_A$ at node A will depend on the values of resistors $R_7$ and $R_8$, which are 10 Mohms and 1 Mohms respectively. Consequently, voltage $V_A$ is typically non-zero during normal full power (evening) operation.

During the night or during inclement weather, photocell PC will not detect the requisite amount of light and will not conduct any current. As a result, node A will remain at non-zero voltage $V_A$ and the non-zero voltage at pins $SHDN_1$ and $SHDN_2$ will keep integrated circuits $IC_1$ and $IC_2$ active. When daylight is detected by photocell PC, photocell PC will start conducting current and since resistor $R_7$ is 1 Mohms, all the current flowing from $V_{BAT}$ through resistor $R_8$ will be directed down through photocell PC to ground causing node A to drop low. As long as daylight is detected, node A will remain low and integrated circuits $IC_1$ and $IC_2$ will remain inactive. When daylight is no longer detected, photocell PC will stop conducting current and node A will return to a non-zero voltage as current starts conducting again through resistors $R_8$ and $R_7$ and through capacitor $C_6$ to ground.

In low battery mode, integrated circuits $IC_1$ and $IC_2$ are configured such that pins $OUT_1$ and $OUT_2$ provide intermittant power to LED array 12 causing marine light 10 to flash on and off continuously. This signals that it is time to install a new power source 20. When the voltage of power source 20 at pin $BATT_1$ falls lower than the threshold voltage set through pin $PFI_1$ then pin $PFO_1$ will sink current to ground (or the voltage at $GND_1$). Voltage divider comprising resistors $R_1$ and $R_2$ is connected across power source 20 and ground, producing a voltage at pin $PFI_1$ to set the threshold voltage. In this implementation, resistors $R_1$ and $R_2$ are 221 Kohms and 475 Kohms, which produces a voltage of 1.024 volts at pin $PFI_1$. The threshold can then be calculated according to the following equation:

$$V_{TH} = \left( \frac{R_1}{R_2} + 1 \right) V_{PFI_1}$$

Thus, when power source 20 falls below approximately 900 millivolts, pin $PFO_1$ will begin to sink current to ground.

When pin $PFO_1$ sinks current to ground, the circuit enters into a similar state as was the case when photocell PC was conductive. That is, current will flow from $V_{BAT}$ through resistor $R_8$ and into pin $PFO_1$ causing voltage $V_A$ at node A to drop to ground. This will cause pins $SHDN_1$ and $SHDN_2$ to shut down integrated circuits $IC_1$ and $IC_2$. Once integrated circuits $IC_1$ and $IC_2$ are placed into shutdown mode, the internal MOSFETs will turn off and pins $PFO_1$ and $PFO_2$ will go high impedance. This will force current to flow again from $V_{BAT}$ through resistors $R_8$ and $R_7$ and capacitor $C_6$ to ground, and capacitor $C_6$ will charge up again. Once capacitor $C_6$ charges up such that $V_A$ pulls pins $SHDN_1$ and $SHDN_2$ high, integrated circuits $IC_1$ and $IC_2$ will become operational again.

Once operational, power source 20 will be detected as falling below 900 millivolts and pin $PFO_1$ will again sink current to ground causing current to flow from $V_{BAT}$ through resistor $R_8$ and into pin $PFO_1$ and capacitor $C_6$ will then discharge through resistor $R_7$. Voltage $V_A$ at node A will then drop to ground and cause pins $SHDN_1$ and $SHDN_2$ to shut down integrated circuits $IC_1$ and $IC_2$. This action will result in a continuous flashing of LED array 12 until power source 20 is removed or replaced. Since resistor $R_7$ and capacitor $C_6$ together constitute a RC circuit, the frequency of the flashing of LED array 12 is dependent on the resonant circuit's time constant. In this implementation, resistor $R_7$ has a value of 10 Mohms and capacitor $C_6$ has a value of 0.22 microfarads resulting in a time constant of 2.2 seconds. Accordingly, when marine light 10 is operating in low battery mode, LED array 12 will flash at a frequency of approximately 2.2 seconds.

Marine light 10 must be installed on a boat such that the light produced is sufficiently visible to other boaters along the surface of a body of water. Power source 20 is preferably located below decks, although it may be placed in any other convenient location which will protect the batteries and metal connections of power source 20 from corrosive environmental effects.

Figure 5A:
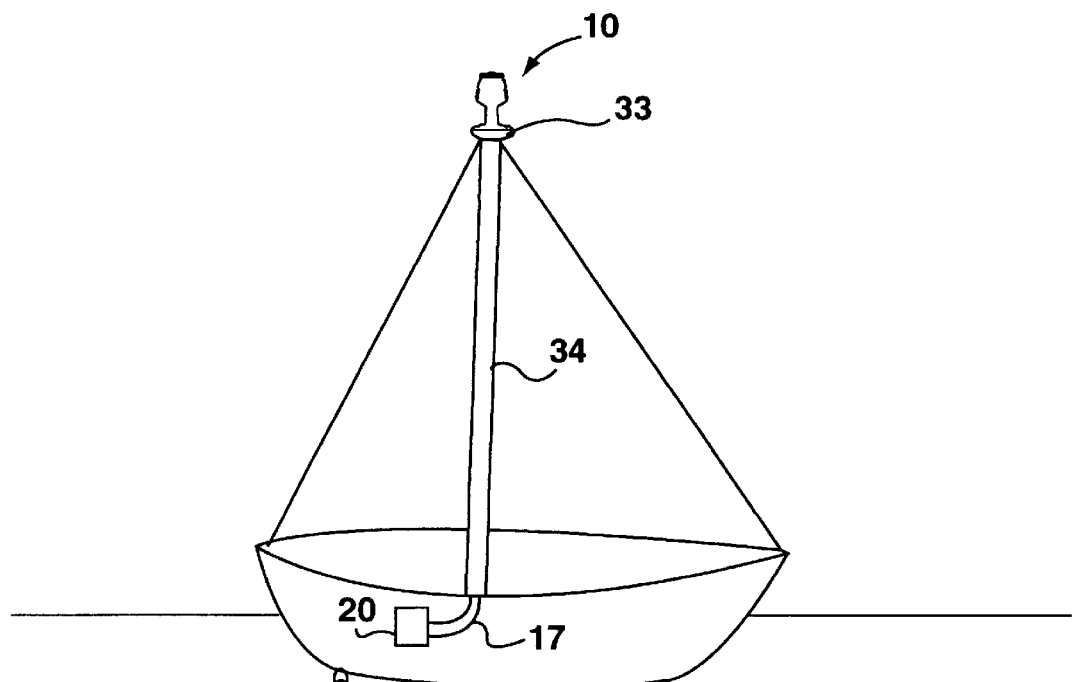
FIG. 5A shows the marine light installed on a masthead.

As shown in FIG. 5A, marine light 10 can be attached to the top of a masthead 33 where it will have optimal visibility when a boat is moored. Masthead 33 is connected to a mast 34 which will preferably be hollow. Lamp wires 17 will then connect power circuit 18 positioned in lamp base 16, through mast 34, to power source 20 positioned below deck.

Figure 5B:
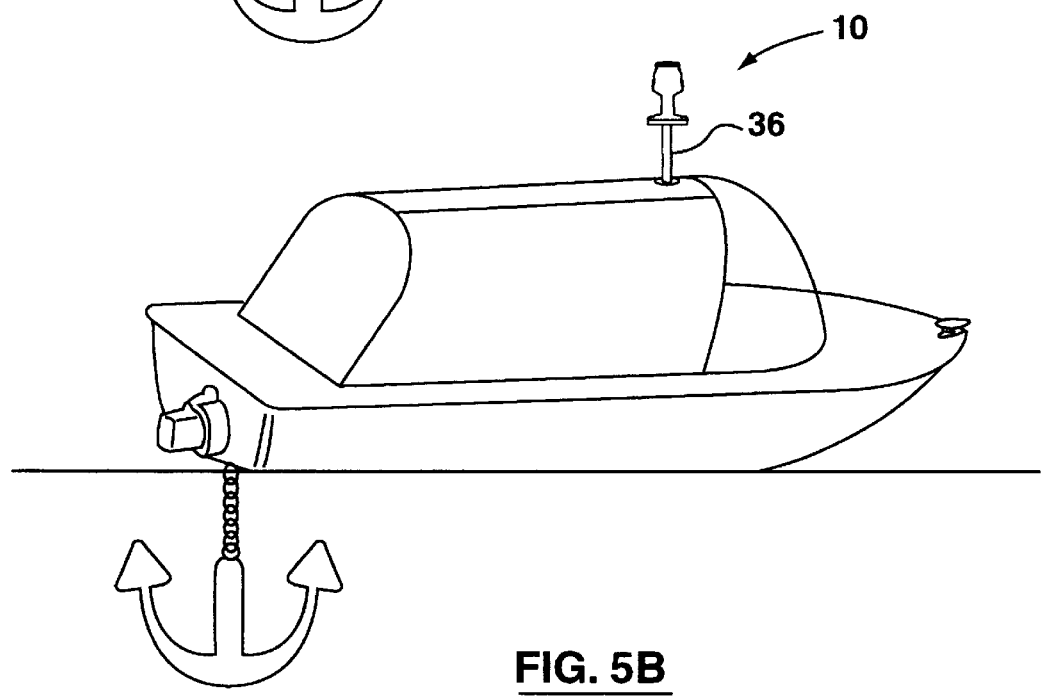
FIG. 5B shows the marine light installed on a pedestal.

As shown in FIG. 5B, marine light 10 may also be installed on top of a pedestal 36 mounted on a cabin of a motor powered vessel. Pedestal 36 will preferably be hollow to allow lamp wires 17 to connect power circuit 18 to power source 20. While this position will not provide optimal visibility, this configuration is compatible with the design of motor powered vessels.

In use, marine light 10 is installed on a boat such that the light produced by light array 12 through lens 14 is visible to other marine crafts. Since marine light 10 automatically shuts down when there is sufficient ambient light and can operate for up to a year on a single 1.5 volt battery pack, the user may install marine light 10 and simply leave the light running. When the power circuit determines that the batteries are running low, marine light 10 begins to flash on and off continuously to signal that it is time for a new battery pack.

Thus, marine light 10 provides a long lasting safety light for marine craft which includes a low battery warning and which automatically shuts off during the day. The star configuration of the LED array 12, is especially suited to application in the marine environment, due to the omnidirectional nature of its output light and the fact that the LEDs themselves are highly resistant to the corrosive effects of a marine environment.

Various alternatives to the preferred embodiment of marine light 10 are possible. For example, the LED array 12 of marine light 10 can be fabricated out of different combinations of LED colours to produce a white light. Further, while it is preferred to use six LEDs in the LED array, it is also possible to implement LED array 12 with fewer or larger numbers of LEDs. For example, eight LEDs could be arranged in a star pattern 45 degrees apart. While the light projected by marine light 10 will not be as uniform with fewer LEDs as it would using the preferred embodiment, it is possible to achieve a functional safety light using such an arrangement. Different types of lenses could be used in place of fresnel lens 23. Power circuit 18 can be comprised of any regulation/power circuit which can convert battery power into 3 volts for consumption by LED arrays 12a and 12b. Also, it is possible for marine light 10 to have variable brightness settings by adapting power circuit 18 to provide higher current to LED array 12 and by installing a potentiometer within power circuit 18. Finally, power source 20 can comprise alternative power sources such as a solar charged battery.

As will be apparent to persons skilled in the art, various modifications and adaptations of the structure described above are possible without departure from the present invention, the scope of which is defined in the appended claims.

We claim:

1. A marine safety light for a boat for alerting other vessels of the presence of the boat, said marine safety light comprising:
   (a) an array of light emitting diodes having a uniform star configuration around a centre point such that the light emitting diodes are equally spaced around the centre point and such that the light emitting diodes face outwardly from the centre point;
   (b) a light transmitting member surrounding the array of light emitting diodes; and
   (c) a power supply for supplying electrical power to the array of light emitting diodes, said power supply comprising a power circuit and a battery such that power circuit provides uniform light output over the course of the lifetime of the battery, the power circuit including a low battery circuit which causes the power circuit to turn the electrical power on and off continuously when the battery is low.

2. The marine safety light of claim 1 wherein the array of light emitting diodes comprises six light emitting diodes arranged 60 degrees apart.

3. The marine safety light of claim 2 wherein the light emitting diodes are spaced apart from each other and oriented such the light emitting diodes produce a series of cones of light, each cone of light having edges that represent a 50 percent falloff in light output from a light emitting diode, the edges of the light cone of one light emitting diode being substantially coincidental with the edges of the light cone of an adjacent light emitting diode.

4. The marine safety light of claim 1 wherein the array of light emitting diodes is comprised of white light emitting diodes.

5. The marine safety light of claim 1 wherein the light transmitting member is a fresnel lens.

6. The marine safety light of claim 1 wherein the light emitting diode array is orientated in the horizontal plane.

7. The marine safety light of claim 1 wherein the battery is a 1.5 volt battery.

8. The marine safety light of claim 1 wherein the power circuit includes a photocell which causes the power circuit to shut off electrical power to the array of light emitting diodes when sufficient ambient light is available.

9. The marine safety light of claim 1 wherein the light emitting diode array and the power circuit are housed within a lamp base.

10. The marine safety light of claim 9 wherein the lamp base and the lens are removably securable and form a watertight enclosure, such that the light emitting diode array and the power circuit are completely housed in the watertight enclosure.

* * * * *